(12) United States Patent
Yamada (10) Patent No.: US 11,038,416 B2
(45) Date of Patent: Jun. 15, 2021

(54) DRIVE SIGNAL GENERATING CIRCUIT AND POWER SUPPLY CIRCUIT FOR IMPROVING POWER FACTOR THEREOF

(71) Applicant: FUJI ELECTRIC CO., LTD., Kawasaki (JP)

(72) Inventor: Ryuji Yamada, Kawasaki (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/696,688

(22) Filed: Nov. 26, 2019

(65) Prior Publication Data
US 2020/0212793 A1 Jul. 2, 2020

(30) Foreign Application Priority Data
Dec. 28, 2018 (JP) .............................. JP2018-247173

(51) Int. Cl.
*H02M 1/42* (2007.01)
*H02M 1/14* (2006.01)
*H02M 3/157* (2006.01)

(52) U.S. Cl.
CPC ........... *H02M 1/4225* (2013.01); *H02M 1/14* (2013.01); *H02M 3/157* (2013.01)

(58) Field of Classification Search
CPC ................. H02M 1/42; H02M 1/4225; H02M 3/155–1588
See application file for complete search history.

(56) References Cited

U.S. PATENT DOCUMENTS

| 7,102,341 | B1 | 9/2006 | Choudhury |
| 7,135,845 | B2 | 11/2006 | Zverev et al. |
| 8,085,562 | B2 | 12/2011 | Sisson |
| 8,787,045 | B1* | 7/2014 | Hung .................. H02M 1/4225 363/39 |

(Continued)

FOREIGN PATENT DOCUMENTS

| JP | H10-66344 A | 3/1998 |
| JP | 2006-087288 A | 3/2006 |

(Continued)

OTHER PUBLICATIONS

R. Brown et al., "PFC Converter Design with IR1150 One Cycle Control IC", International Rectifier, AN-1077, pp. 1-18.

*Primary Examiner* — Peter M Novak
(74) *Attorney, Agent, or Firm* — Rabin & Berdo, P.C.

(57) ABSTRACT

A drive signal generating circuit that generates a drive signal for turning on and off a transistor based on an output voltage and an inductor current flowing through an inductor, includes: a reference current output unit that outputs a reference current serving as a reference for the inductor current; a command value output unit that outputs a command value for increasing and decreasing the inductor current when the inductor current is smaller and greater than the reference current, respectively; and a drive signal output unit that outputs the drive signal based on the command value such that the output voltage achieves a target level, the reference current output unit configured to output the reference current based on the command value output from the command value output unit and a value corresponding to a first error between a level of the output voltage and the target level.

12 Claims, 9 Drawing Sheets

(56) References Cited

U.S. PATENT DOCUMENTS

| | | |
|---|---|---|
| 2005/0013076 A1 | 1/2005 | Zverev et al. |
| 2006/0031736 A1 | 2/2006 | Fahlenkamp et al. |
| 2006/0043956 A1 | 3/2006 | Clavette |
| 2009/0273330 A1 | 11/2009 | Sisson |
| 2010/0110739 A1* | 5/2010 | Nishikawa .......... H02M 1/4225 363/124 |
| 2016/0190912 A1* | 6/2016 | Lim .................... G01R 21/006 363/84 |

FOREIGN PATENT DOCUMENTS

| | | |
|---|---|---|
| JP | 2008-113514 A | 5/2008 |
| JP | 2014-235993 A | 12/2014 |
| JP | 2016-093001 A | 5/2016 |
| JP | 2017-112822 A | 6/2017 |

\* cited by examiner

DRIVE SIGNAL GENERATING CIRCUIT AND POWER SUPPLY CIRCUIT FOR IMPROVING POWER FACTOR THEREOF

CROSS-REFERENCE TO RELATED APPLICATION

This application claims priority pursuant to 35 U.S.C. § 119 from Japanese Patent Application No. 2018-247173, filed on Dec. 28, 2018, the entire disclosure of which is hereby incorporated by reference herein.

BACKGROUND

Technical Field

The present disclosure relates to a drive signal generating circuit and a power supply circuit for improving power factor thereof.

Related Art

Typical power factor correction circuits (hereinafter referred to as PFC circuits) improve a power factor of a power supply by shaping the waveform of an inductor current flowing through an inductor in the PFC circuit to be similar to the waveform of a rectified voltage obtained by rectifying an AC voltage (for example, Japanese Patent Application Publication No. 2014-235993).

In a PFC circuit disclosed in Japanese Patent Application Publication No. 2014-235993, an inductor current having a waveform similar to a waveform of a rectified voltage is produced based on a voltage obtained by dividing the rectified voltage with resistors. In such a circuit, power is consumed by the resistors that are used for dividing the rectified voltage even while the PFC circuit is not operating, thereby increasing power consumption of the PFC circuit.

The present disclosure has been achieved in view of such an issue as above, and an object thereof is to provide a drive signal generating circuit capable of reducing power consumption of a PFC circuit.

SUMMARY

A main aspect of the present disclosure for solving an issue described above is a drive signal generating circuit configured to generate a drive signal based on an output voltage generated from an AC voltage and an inductor current flowing through an inductor, the inductor being configured to be applied with a voltage from a rectifier circuit configured to rectify the AC voltage, the drive signal being used for turning on and off a transistor configured to control the inductor current, the drive signal generating circuit comprising: a reference current output unit configured to output a reference current serving as a reference for the inductor current; a command value output unit configured to output a command value for increasing the inductor current when the inductor current is smaller than the reference current and decreasing the inductor current when the inductor current is greater than the reference current; and a drive signal output unit configured to output the drive signal based on the command value such that the output voltage achieves a target level, the reference current output unit being configured to output the reference current based on a value corresponding to a first error between a level of the output voltage and the target level and the command value output from the command value output unit.

According to the present disclosure, it is possible to provide a drive signal generating circuit capable of reducing power consumption of a PFC circuit.

BRIEF DESCRIPTION OF THE DRAWINGS

FIG. 7 is a diagram illustrating a configuration of a DSP 42a.

DETAILED DESCRIPTION

At least the following details will become apparent from descriptions of the present specification and of the accompanying drawings.

EMBODIMENTS

Overview of AC-DC Converter 10

Figure 1:
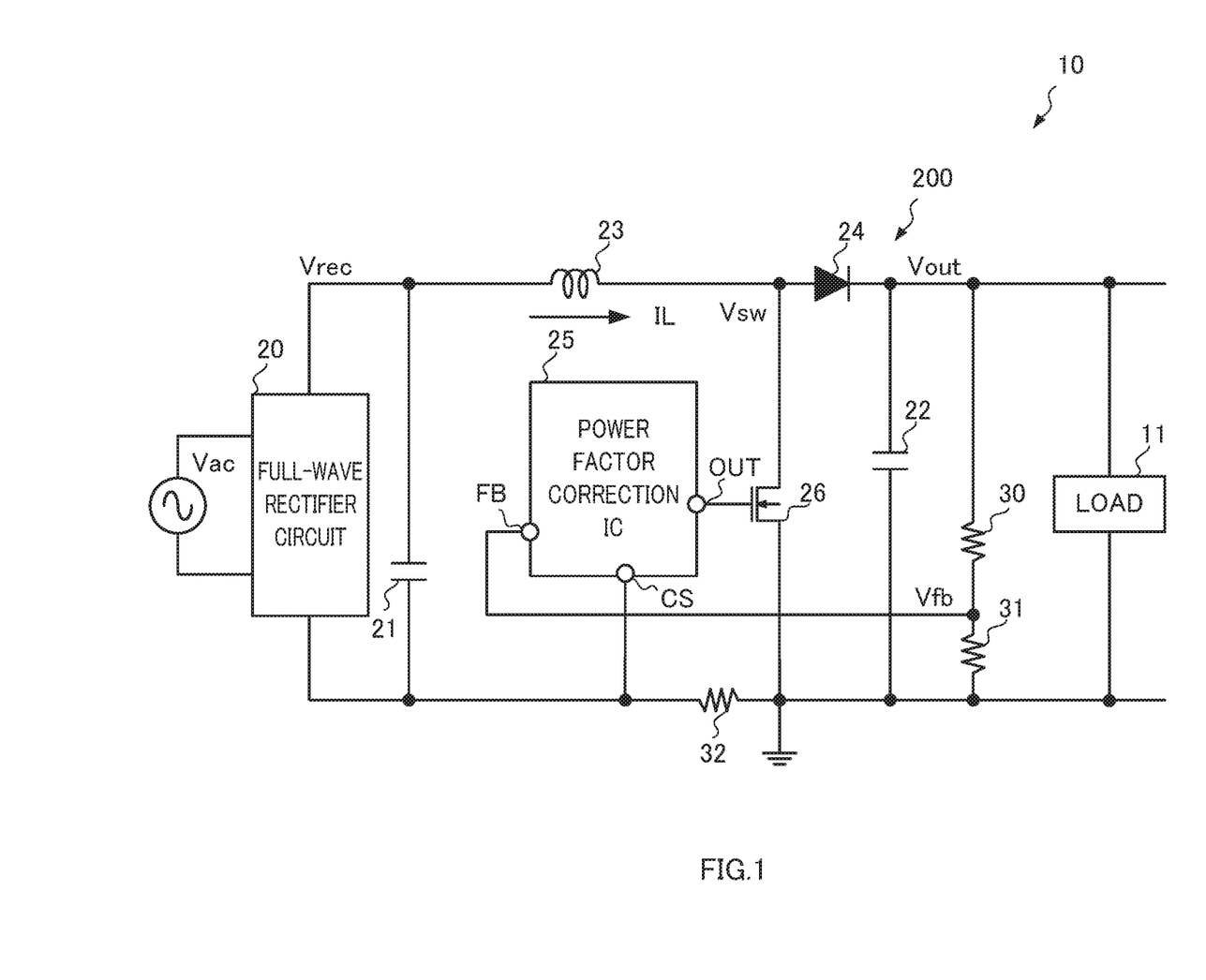
FIG. 1 is a diagram illustrating an example of an AC-DC converter 10.

FIG. 1 is a diagram illustrating the configuration of an AC-DC converter 10 according to an embodiment of the present disclosure. The AC-DC converter 10 is a boost chopper-type power supply circuit that generates an output voltage Vout of a target level from an AC voltage Vac of a commercial power supply.

The AC-DC converter 10 (power supply circuit) includes a full-wave rectifier circuit 20, capacitors 21 and 22, an inductor 23, a diode 24, a power factor correction IC 25, an NMOS transistor 26, and resistors 30 to 32.

The full-wave rectifier circuit 20 performs full-wave rectification of the predetermined AC voltage Vac inputted thereinto, and outputs the result as an input voltage Vrec to the capacitor 21 and the inductor 23. Note that the AC voltage Vac is a voltage having an effective value of 140 to 240 V and a frequency of 50 to 60 Hz. Hereinafter, in an embodiment of the present disclosure, a voltage basically refers to a potential difference from a reference point (GND in the drawing), but the AC voltage Vac is a voltage between terminals.

The capacitor 21 smooths the input voltage Vrec, and the capacitor 22 configures a boost chopper circuit with the inductor 23, the diode 24, and the NMOS transistor 26. Accordingly, the charging voltage of the capacitor 22 is the DC output voltage Vout. Note that a circuit configured with the capacitor 22, the inductor 23, the diode 24, and the NMOS transistor 26 will be referred to as a boost chopper circuit 200.

The power factor correction IC 25 (drive signal generating circuit) is an integrated circuit that controls the switching of the NMOS transistor 26 such that the output voltage Vout achieves the target level (e.g., 400 V) while improving the power factor of the AC-DC converter 10. Specifically, the power factor correction IC 25 drives the NMOS transistor 26 based on an inductor current IL flowing through the inductor 23 and the output voltage Vout. While details of the power factor correction IC 25 will be described later, the power factor correction IC 25 has terminals CS, FB, and OUT. Note that in an embodiment of the present disclosure, the terminals of the power factor correction IC 25 other than the terminal CS and the like are omitted for convenience.

The NMOS transistor 26 is a switching element for controlling the power to a load 11 of the AC-DC converter 10. Note that while the NMOS transistor 26 is an N-type metal oxide semiconductor (MOS) transistor in an embodiment of the present disclosure, but the NMOS transistor 26 may be a bipolar transistor or an insulated gate bipolar transistor (IGBT), for example. Also, the gate electrode of the NMOS transistor 26 is coupled to the terminal OUT.

The resistors 30 and 31 configure a voltage divider circuit that divides the output voltage Vout, and produces a feedback voltage Vfb used in switching the NMOS transistor 26. Note that the feedback voltage Vfb, which is produced at a node at which the resistors 30 and 31 are coupled, is applied to the terminal FB.

The resistor 32 is a resistor for detecting the inductor current IL, and has one end coupled to the source electrode of the NMOS transistor 26 and the other end coupled to the terminal CS.

Boost Chopper Circuit 200

Case Where Input Voltage and Output Voltage are Constant

Figure 2:
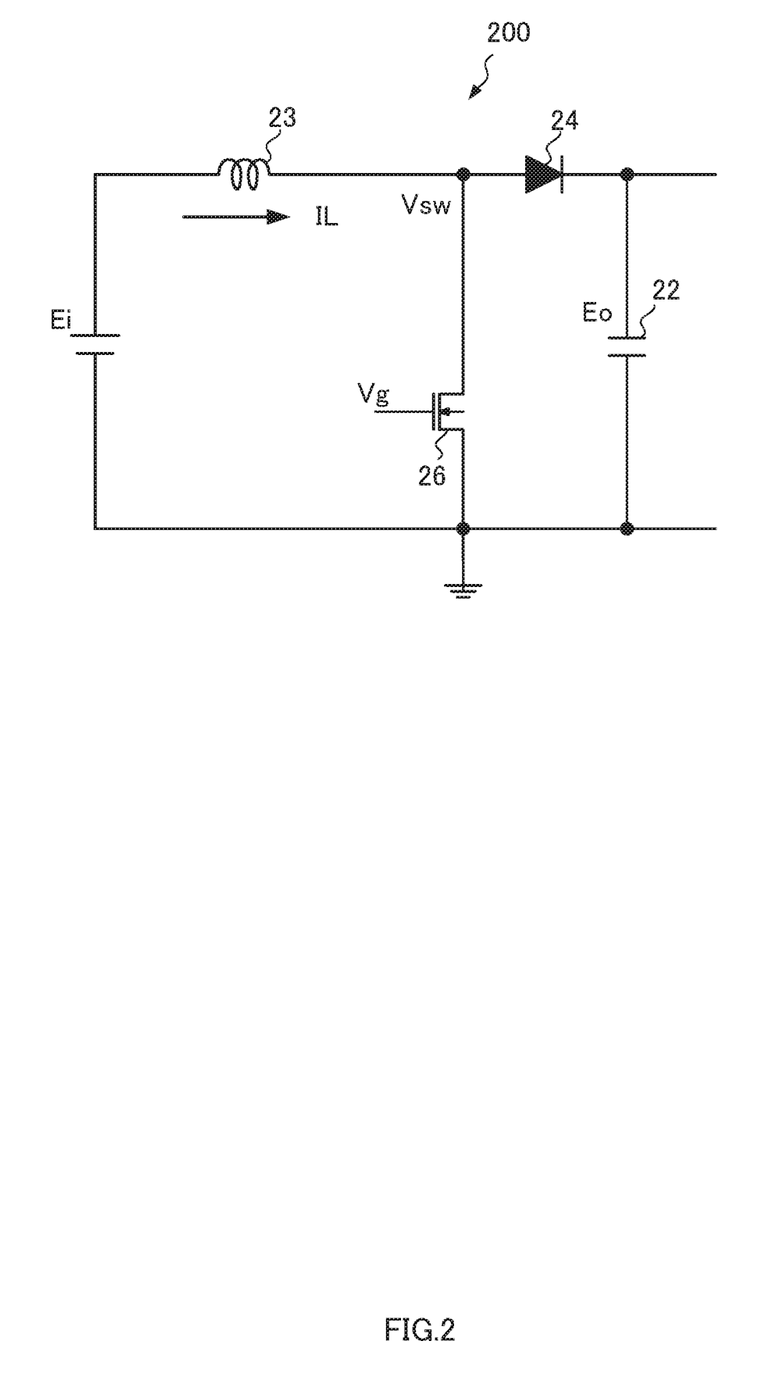
FIG. 2 is a diagram illustrating a configuration of a boost chopper circuit 200.

FIG. 2 is a diagram for explaining the operation of the boost chopper circuit 200 in a case where the input voltage and the output voltage are constant. In FIG. 2, the same circuit elements as in FIG. 1 are denoted by the same reference numerals. However, in FIG. 2, the input voltage is denoted as "Ei" and the output voltage is denoted as "Eo". Also, a voltage at a node coupled with the drain electrode of the NMOS transistor 26, the inductor 23, and the diode 24 is denoted as a voltage Vsw.

Figure 3:
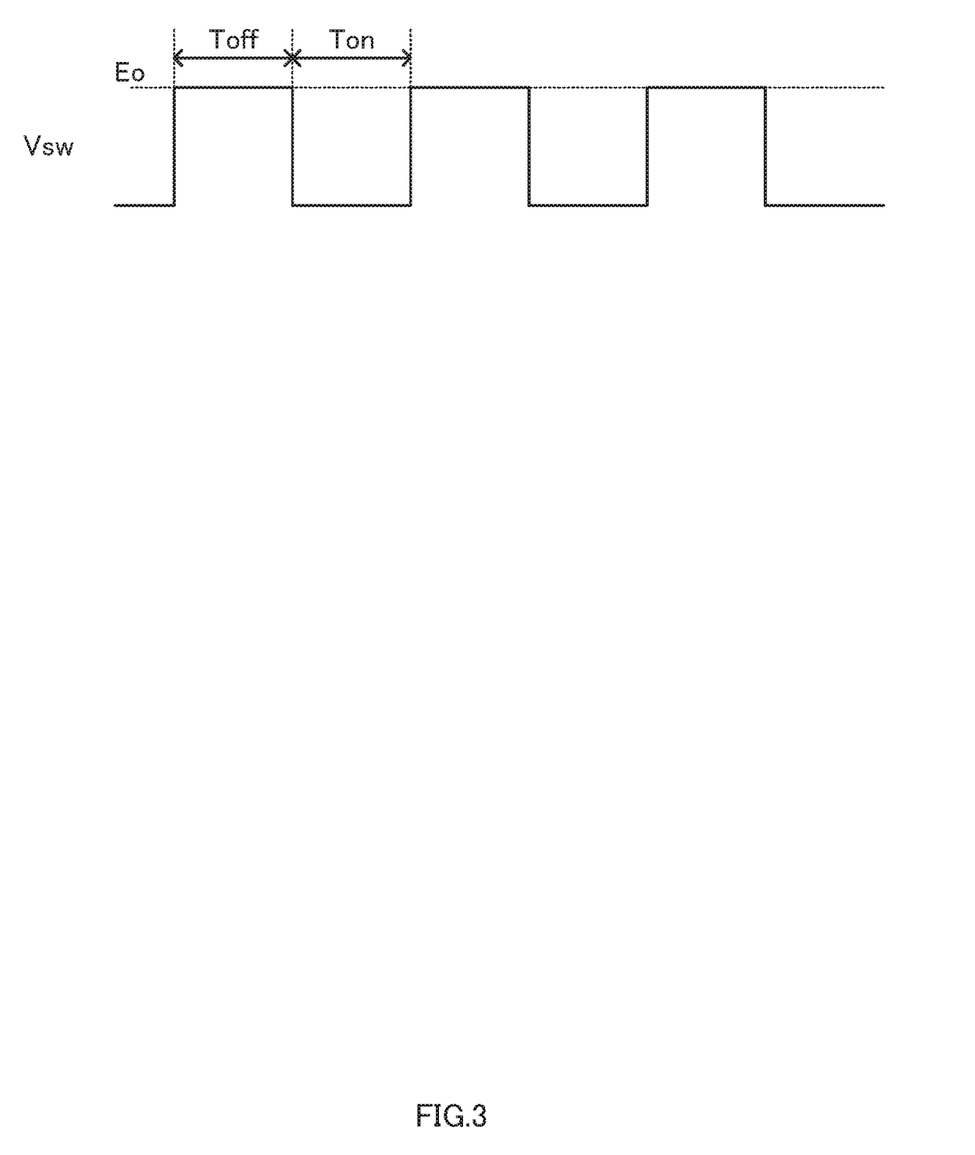
FIG. 3 is a diagram for explaining an operation of a boost chopper circuit 200.

FIG. 3 is a diagram illustrating an example of variations in the voltage Vsw during switching of the NMOS transistor 26. Here, the NMOS transistor 26 is switched in response to a drive signal Vg having a predetermined cycle and a predetermined duty ratio, for example.

The voltage Vsw is the output voltage Eo when the NMOS transistor 26 is off, and the voltage Vsw is a ground voltage (0 V) when the NMOS transistor 26 is on. Here, an average voltage Vsw (ave) of the voltage Vsw is expressed by Equation (1).

$$Vsw(\text{ave})=(Toff/(Ton+Toff))\times Eo \qquad (1)$$

where "Ton" and "Toff" are a period of time during which the NMOS transistor 26 is on and a period of time during which the NMOS transistor 26 is off in a single cycle of the drive signal Vg for the NMOS transistor 26, respectively.

Further, the average voltage values of two ends of the inductor 23 are substantially equal in a state where the amount of increase in current of the inductor 23 in an ON-time Ton and the amount of decrease in current of the inductor 23 in an OFF-time Toff are equal, that is, in a steady state where the DC component or low-frequency component (hereinafter simply referred to as the "DC component") of the current are constant. In other words, in such a case, the input voltage Ei and the average value of the voltage Vsw are substantially equal, and Equation (2) is given.

$$Ei \approx Vsw(\text{ave})=Doff \times Eo \qquad (2)$$

where "Doff" is Toff/(Ton+Toff), i.e., the duty ratio of an OFF-time in the drive signal Vg of a predetermined frequency.

Thus, in the boost chopper circuit 200, the duty ratio Doff, at which the NMOS transistor 26 is turned off, is uniquely determined when the input voltage Ei and the output voltage Eo are constant.

Further, in the steady state, a DC current of a given value (e.g., 1 A or 5 A) corresponding to the magnitude of the load (not illustrated) coupled in parallel to the capacitor 22 flows through the inductor 23. In this occasion, if ignoring a resistance component in the boost chopper circuit 200 (e.g., the winding resistance of the inductor 23) and the voltage drop of the NMOS transistor 26 or the diode 24, Equation (2) is established in the steady state regardless of the value of the DC current. That is, Equation (2) is established in the steady state regardless of whether the DC component of the inductor current IL is 1 A or 10 A.

Further, the boost chopper circuit 200 is capable of controlling the DC component of the inductor current IL as desired as long as it is within such a short period of time that voltage change of the capacitor 22 is ignorable. Specifically, the DC component of the inductor current IL is increased by decreasing the duty ratio Doff of Equation (2) so as to establish Ei>Vsw(ave)=Doff×Eo. On the other hand, the DC component of the inductor current IL is decreased by increasing the duty ratio Doff so as to establish Ei<Vsw(ave)=Doff×Eo. By establishing Ei=Vsw (ave) at the point when the inductor current IL is at a desired value, the DC component of the inductor current IL is maintained at a constant value. While more details will be described later, this is how to control the waveform of the input current in the PFC circuit and more details will be described later.

Here, in the case where the boost chopper circuit 200 illustrated in FIG. 2 performs, in the circuit in FIG. 1, the later-described operation of controlling the inductor current IL so as to achieve half sine waves having a waveform similar to the rectified waveform of the AC voltage Vac, the NMOS transistor 26 is switched at a higher frequency than the frequency of the AC voltage Vac (50 to 60 Hz), e.g., several tens of kHz. In such a case, the inductance of the inductor 23 can be a small value, and thus it is common that the impedance of the inductor 23 for low frequency is extremely low.

Accordingly, even in the case where Ei>Vsw(ave) or Ei<Vsw(ave) as mentioned above, the voltage difference between the input voltage Ei and the average voltage Vsw (ave), that is, the frequency of the AC voltage Vac or a frequency component therearound is actually small (e.g., a value less than 1% of the input voltage Ei). Hence, it is acceptable to assume Ei≈Vsw(ave) as an approximate value.

As described above, in the steady state, the average voltage Vsw(ave) is equal to the input voltage Ei. Thus, in the boost chopper circuit 200, it is possible to figure out the input voltage Ei without directly detecting the input voltage Ei by figuring out the average voltage Vsw(ave).

Also, it is possible to bring the inductor current IL into the steady state, for example, by controlling the inductor current IL to achieve a predetermined value. Thus, in the state where the inductor current IL is controlled to achieve the predetermined value, it is possible to figure out the input voltage Ei without directly detecting the input voltage Ei by figuring out the average voltage Vsw(ave).

Case Where Input Voltage Varies and Output Voltage is Constant

Figure 4:
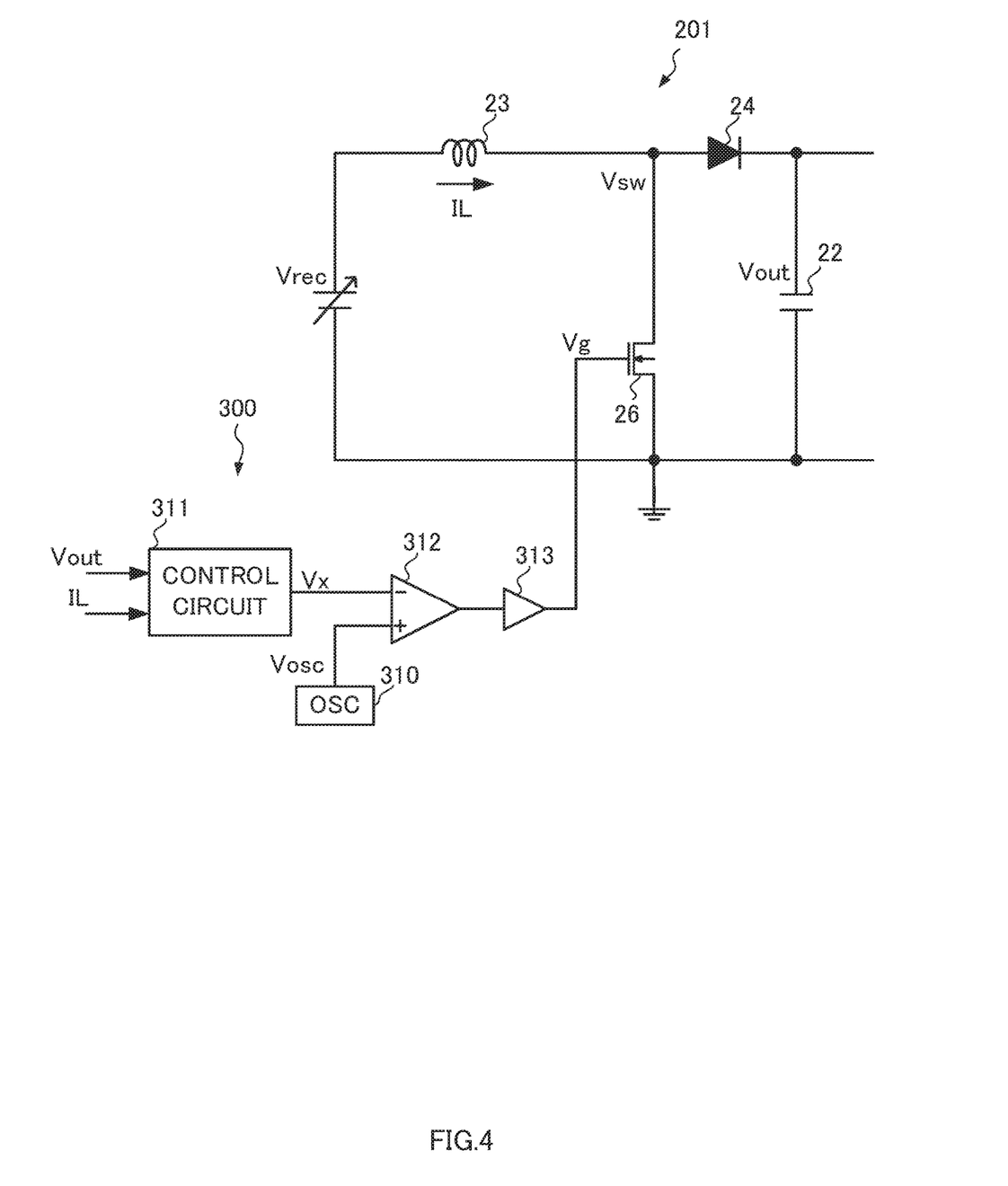
FIG. 4 is a diagram illustrating a configuration of a boost chopper circuit 201.

FIG. 4 is a diagram for explaining the operation of a boost chopper circuit 201 in a case where the input voltage varies and the output voltage is constant. In FIG. 4, the circuit elements denoted by the same reference numerals as those in FIGS. 1 and 2 are the same. Here, the input voltage is denoted as the input voltage Vrec obtained by rectifying the AC voltage Vac, as illustrated in FIG. 1. Also, FIG. 4 illustrates a drive circuit 300 that drives the NMOS transistor 26. The drive circuit 300 includes an oscillator circuit 310, a control circuit 311, a comparator 312, and a gate driver 313.

The oscillator circuit 310 outputs an oscillating voltage Vosc of a predetermined frequency that varies in a triangular waveform. The control circuit 311 is a current-mode control circuit including a voltage loop and a current loop as feedback loops. Note that "current mode control" refers to, for example, a type of control under which the inductor current IL achieves a target value that is internally produced (i.e., the current value of a reference current) so that the output voltage Vout achieves a desired level. The control circuit 311 outputs a command voltage Vx for causing the output voltage Vout to achieve the desired level based on the output voltage Vout and the inductor current IL, for example.

The comparator 312 compares the oscillating voltage Vosc with the command voltage Vx, which serves as a reference for the duty ratio of the drive signal Vg. Specifically, the comparator 312 outputs a high-level (hereinafter referred to as "H-level") signal when the oscillating voltage Vosc is higher than the command voltage Vx, and outputs a low-level (hereinafter referred to as "L-level") signal when the oscillating voltage Vosc is lower than the command voltage Vx.

The gate driver 313 outputs a drive signal Vg for turning on the NMOS transistor 26 when an H-level signal is output from the comparator 312 and turning off the NMOS transistor 26 when an L-level signal is output from the comparator 312.

Here, the control circuit 311 is a current-mode control circuit that causes the inductor current IL to achieve a target value. Also, the winding resistance of the inductor 23 and the like are generally low, as mentioned above. Accordingly, in the state where the inductor current IL is controlled at the target value, the input voltage Vrec and the average voltage Vsw(ave) are equal.

Thus, when the inductor current IL is controlled in the boost chopper circuit 201, information on the input voltage Vrec can be obtained by figuring out the average voltage Vsw(ave).

Also, the relation expressed by Equation (3) below is established between the input voltage Vrec and the output voltage Vout in the boost chopper circuit 201.

$$Vrec = Doff \times Vout \quad (3)$$

Further, in the state where the inductor current IL is controlled at the target value, the average voltage Vsw(ave) and the input voltage Vrec are substantially equal. Thus, the relation expressed by Equation (4) below is given.

$$Vrec \approx Vsw(ave) = Doff \times Vout \quad (4)$$

Further, in the boost chopper circuit 201, the output voltage Vout is feedback-controlled to achieve a desired level. Hence, in the case where the boost chopper circuit 201 is operated using the control circuit 311, the duty ratio Doff (more specifically, the command voltage Vx for determining the duty ratio Doff) and the average voltage Vsw(ave) vary similarly to the input voltage Vrec.

Thus, in such a case, the input voltage Vrec can be estimated by figuring out the duty ratio Doff, i.e., the command voltage Vx, instead of the average voltage Vsw(ave).

Figure 5:
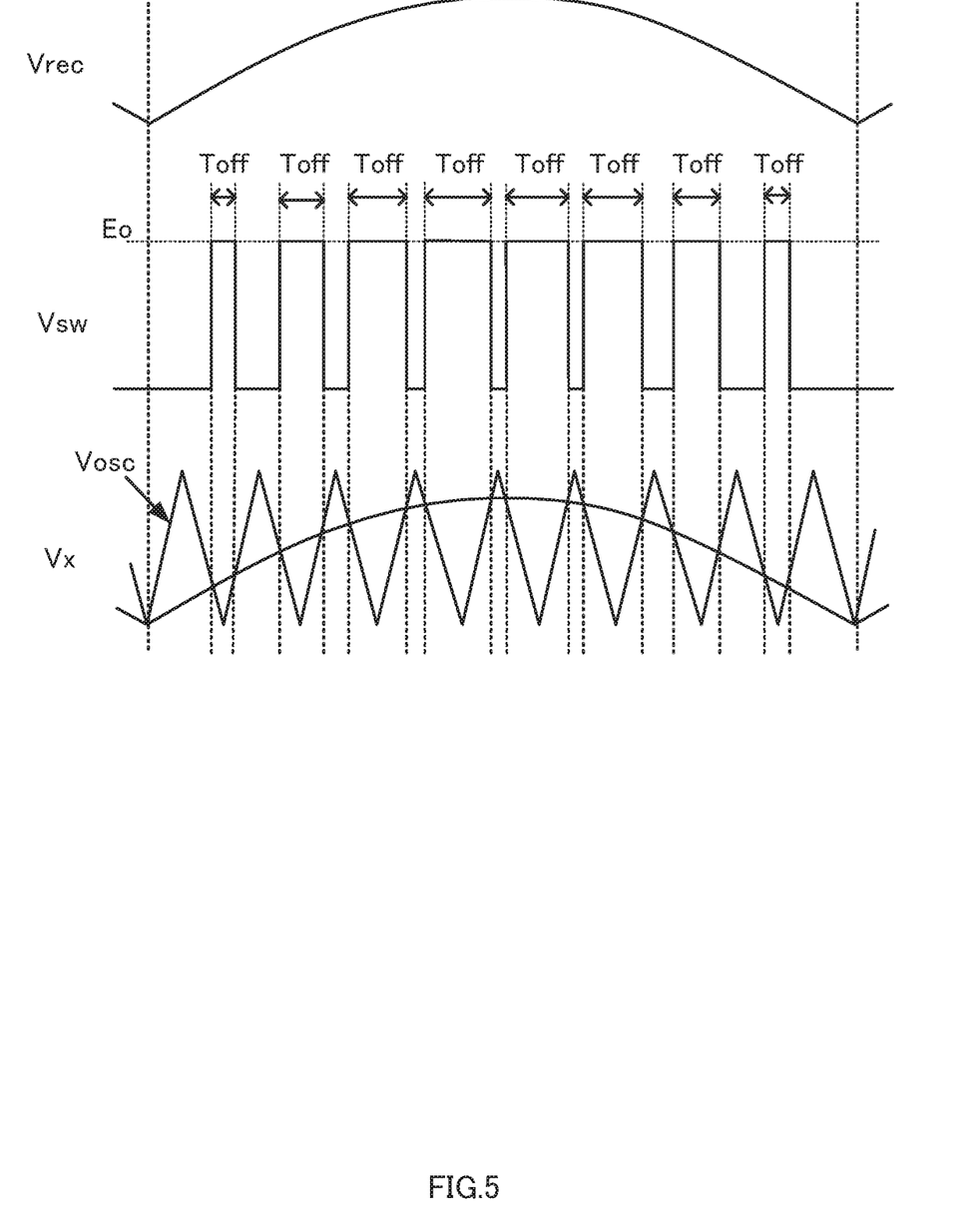
FIG. 5 is a diagram illustrating main waveforms in a boost chopper circuit 201.

Here, the command voltage Vx, which varies similarly to the input voltage Vrec, will be described with reference to FIG. 5. The input voltage Vrec is a voltage obtained by full-wave rectifying the AC voltage Vac. Thus, its instantaneous value varies from 0 V to $240 \times \sqrt{2} = 339$ V, for example. In order for the control circuit 311 of the boost chopper circuit 201 to continue producing a constant output voltage Vout with such an input voltage Vrec, the OFF-time duty ratio Doff needs to increase with increase in the input voltage Vrec, as is apparent from Equation (3). Accordingly, the control circuit 311 outputs a command voltage Vx that varies similarly to the input voltage Vrec.

Further, if the target value of the inductor current IL can be varied with the command voltage Vx, the inductor current IL results in varying similarly to the input voltage Vrec. While details will be described later, the power factor correction IC 25 in an embodiment of the present disclosure sets the command voltage Vx, which varies similarly to the input voltage Vrec, as the target value of the inductor current IL. Hence, the inductor current IL also results in having the waveform of rectified sine waves similar to the waveform of the input voltage Vrec, which improves the power factor of a power supply. The details will now be given of the power factor correction IC 25 which improves the power factor of the power supply by using the command voltage Vx varying similarly to the input voltage Vrec.

Power Factor Correction IC 25

Configuration of Power Factor Correction IC 25

Figure 6:
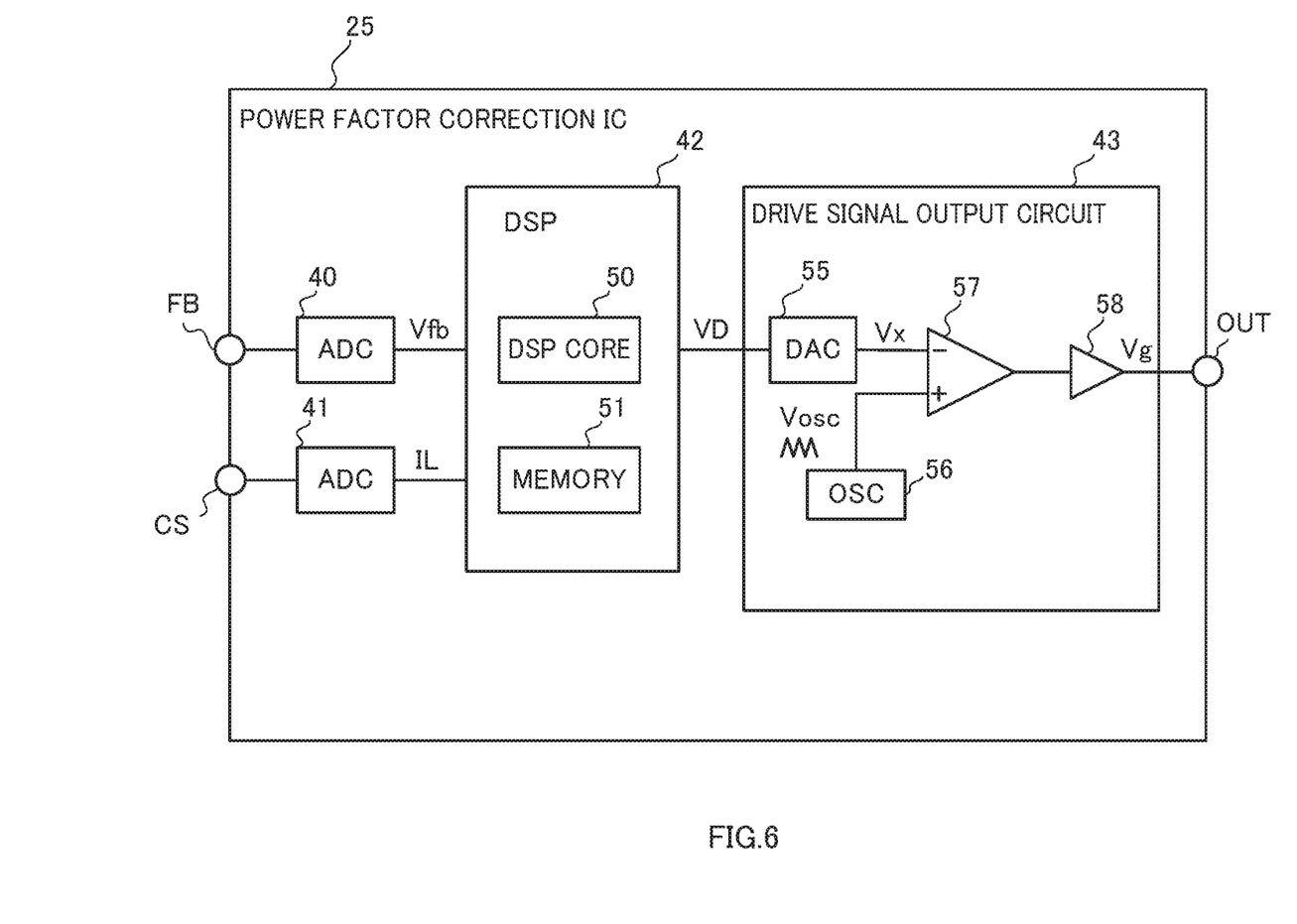
FIG. 6 is a diagram illustrating a configuration of a power factor correction IC 25.

FIG. 6 is a diagram illustrating the configuration of the power factor correction IC 25. The power factor correction IC 25 includes AD converters (ADC: Analog-to-Digital Converter) 40 and 41, a Digital Signal Processor (DSP) 42, and a drive signal output circuit 43.

The AD converter 40 converts the feedback voltage Vfb into a digital value, and the AD converter 41 converts a voltage indicating the inductor current IL detected by the resistor 32 into a digital value. Note that in an embodiment of the present disclosure, the voltage indicative of the inductor current IL and is to be processed by the DSP 42 will be referred to as the inductor current IL for convenience.

The DSP 42 is a circuit that generates a command voltage VD, which serves as a reference for the drive signal Vg, based on the feedback voltage Vfb and the inductor current IL.

The DSP 42 includes: a DSP core 50; and a memory 51 storing a program to be executed by the DSP core 50, and various pieces of information. While details will be described later, the DSP core 50 executes the program to cause the DSP 42 to implement various functions such as the functions of an adder, subtractors, a multiplier, a divider, a filter, and an amplifier.

The drive signal output circuit 43 (drive signal output unit) outputs the drive signal Vg for turning on and off the NMOS transistor 26 to the terminal OUT based on the command voltage VD.

The drive signal output circuit 43 includes a DA converter (DAC: Digital-to-Analog Converter) 55, an oscillator circuit 56, a comparator 57, and a gate driver 58.

The DAC 55 converts the command voltage VD, which is a digital value, into an analog value and outputs the result as the command voltage Vx (=VD).

The oscillator circuit 56 outputs an oscillating voltage Vosc of a predetermined frequency that varies in a triangular waveform. The comparator 57 (comparison unit) outputs an L-level signal when the command voltage Vx is higher than the oscillating voltage Vosc, and outputs an H-level signal when the command voltage Vx is lower than the oscillating voltage Vosc.

The gate driver 58 outputs, to the terminal OUT, a drive signal Vg for turning on the NMOS transistor 26 based on the H-level signal from the comparator 57 and turning off the NMOS transistor 26 based on the L-level signal from the comparator 57. Thus, in an embodiment of the present disclosure, as the command voltage VD (or the command voltage Vx) rises, the OFF duty ratio Doff of the NMOS transistor 26 increases.

DSP 42a

Figure 7:
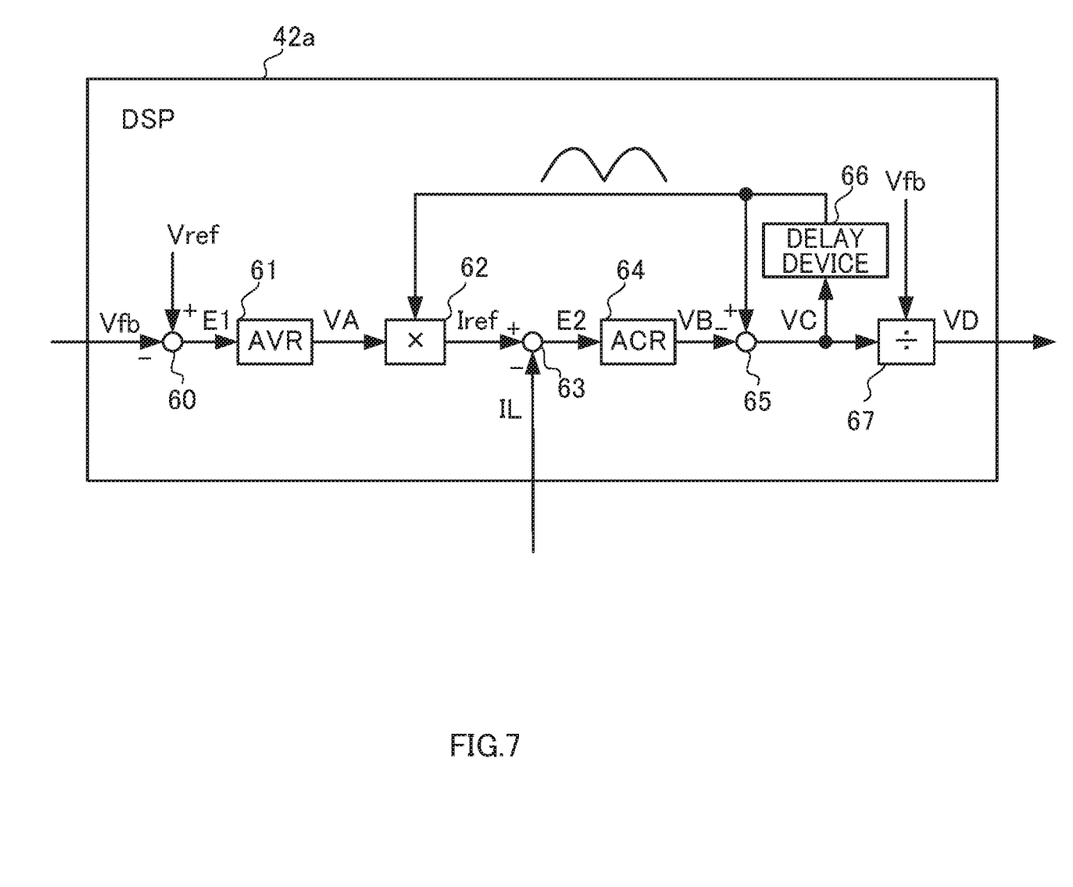

FIG. 7 is an example of a flow of a process (so-called a signal flow chart) performed by functional blocks implemented in a DSP 42a, which is one embodiment of the DSP 42. The DSP 42a produces a command voltage VD, which serves as a reference for a drive signal Vd, based on the feedback voltage Vfb and the inductor current IL. Note that, in an embodiment of the present disclosure, the feedback voltage Vfb indicates the feedback value of the output voltage output from the AD converter 40, but will be simply referred to as the feedback voltage Vfb for convenience.

The DSP 42a includes subtractors 60, 63, and 65, a voltage regulator (AVR: Automatic Voltage Regulator) 61, a multiplier 62, a current regulator 64 (ACR: Automatic Current Regulator), a delay device 66, and a divider 67.

The subtractor 60 subtracts the feedback voltage Vfb from a reference voltage Vref which serves as a reference for the output voltage Vout of the target level (e.g., 400 V), to calculate an error E1 (first error) between the reference voltage Vref and the feedback voltage Vfb.

The voltage regulator 61 outputs a command voltage VA for causing the feedback voltage Vfb to achieve the level of the reference voltage Vref, according to the error E1. Note that the subtractor 60 and the voltage regulator 61 correspond to a so-called error amplifier circuit that performs amplification, integration, and the like of the error E1, for example.

The multiplier 62 (reference current output unit) multiplies the command voltage VA and an output from the delay device 66, which will be described later, and outputs the product as a reference current Iref which serves as a reference for the inductor current IL. Note that in an embodiment of the present disclosure, the reference current Iref indicates a current command value output from the multiplier 62 (multiplier unit) but will be simply referred to as the reference current Iref for convenience.

The subtractor 63 subtracts the inductor current IL from the reference current Iref, to calculate an error E2 (second error) between the reference current Iref and the inductor current IL.

The current regulator 64 outputs a command voltage VB for causing the inductor current IL to achieve the current value of the reference current Iref, according to the error E2. Note that the current regulator 64 in an embodiment of the present disclosure outputs a positive command voltage VB when the reference current Iref is greater than the inductor current IL and outputs a negative command voltage VB when the reference current Iref is smaller than the inductor current IL. Also, the subtractor 63 and the current regulator 64 correspond to a so-called error amplifier circuit that performs amplification, integration, and the like on the error, for example.

The subtractor 65 (first subtractor unit) subtracts the command voltage VB from the output of the delay device 66, to calculate a command voltage VC. While details will be described later, the output of the delay device 66 is a previously output command voltage VC.

The delay device 66 (delay unit) delays the command voltage VC by a predetermined time period (e.g., a time period per sample in the DSP 42a) and outputs the result.

Here, the current regulator 64 and the subtractor 65 output a command voltage VC (command value) for causing the inductor current IL to achieve the current value of the reference current Iref. Specifically, the current regulator 64 and the subtractor 65 output a command voltage VC for increasing the inductor current IL when the inductor current IL is smaller than the reference current Iref and decreasing the inductor current IL when the inductor current IL is greater than the reference current Iref.

Also, the subtractor 65 subtracts the command voltage VB, which is needed for the inductor current IL to achieve the reference current Iref, from the command voltage VC of the immediately preceding sample (or adds the command voltage VB thereto if it is a negative voltage) and outputs the difference (or sum) as a new command voltage VC. Such a configuration eliminates the need for the current regulator 64 to greatly vary the command voltage VB and thus improves control characteristics of the current feedback loop. Note that the current regulator 64 and the subtractor 65 correspond to a command value output unit.

The divider 67 (voltage suppressing unit) is a block that divides the command voltage VC by a voltage obtained by dividing the output voltage Vout (e.g., feedback voltage Vfb). Here, the subtractor 63, the current regulator 64, and the subtractor 65 correspond to the command value output unit.

Operation of Power Factor Correction IC 25 Using DSP 42a

The operation of the power factor correction IC 25 using the DSP 42a will be described. Note that in the following, a description will be firstly given of the operations associated with the current loop and the voltage loop among the feedback loops of the power factor correction IC 25.

Current Loop

For example, as the power factor correction IC 25 starts operating, the voltage regulator 61 of the DSP 42a outputs a command voltage VA corresponding to the error E1, and the multiplier 62 outputs a reference current Iref corresponding to the command voltage VA.

Here, for example, when the reference current Iref is greater than the inductor current IL, a positive command voltage VB is output from the current regulator 64. As a result, the subtractor 65 subtracts the positive command voltage VB from a previously output command voltage VC, so that the command voltage VC from the subtractor 65 drops. Also, the divider 67 (divider unit) divides the command voltage VC, for example, by the feedback voltage Vfb so that the command voltage VD drops as well. Note that the feedback voltage Vfb is substantially constant during a time period during which the divider 67 executes the dividing process (e.g., a time period corresponding to a single sample in the DSP 42a).

As a result, the voltage Vx drops as well, so that the duty ratio Doff decreases (that is, a time period during which the NMOS transistor 26 is on increases), so that the inductor current IL increases to achieve the reference current Iref. Note that this state corresponds to the state where Ei>Vsw (ave)=Doff×Eo in FIG. 2 described above, and is the same as the state where the inductor current IL increases to be closer to the reference current Iref.

On the other hand, for example, when the reference current Iref is smaller than the inductor current IL, a negative command voltage VB is output from the current regulator 64. As a result, the subtractor 65 adds the command voltage VB to a previously output command voltage VC, so that the command voltage VC rises. As a result, the command voltage VD and the command voltage Vx rise as well, so that the duty ratio Doff increases (that is, a time period during which the NMOS transistor 26 is on decreases). Consequently, the inductor current IL decreases to be the reference current Iref. Note that this state corresponds to the state where Ei<Vsw(ave)=Doff×Eo in FIG. 2, and is the same as the state where the inductor current IL increases to be closer to the reference current Iref.

In other words, in the power factor correction IC 25, a current loop is formed such that the inductor current IL achieves the reference current Iref. Moreover, the operation of causing the inductor current IL to achieve the reference current Iref, which is the target value, is performed on the level of an instantaneous value of the reference current Iref. Thus, while details will be described later, if the reference current Iref has the waveform of rectified sine waves, the inductor current IL results in having a similar waveform as well.

Voltage Loop

Next, a description will be given of the operation associated with the voltage loop among the feedback loops of the power factor correction IC 25. If the output voltage Vout rises from the target level (e.g., 400 V) while the average value of the input voltage Vrec is constant, the feedback voltage Vfb rises as well. Then, as the command voltage VA drops with rise in the feedback voltage Vfb, the average value of the reference current Iref decreases as well. As a result, the average value of the inductor current IL decreases as well and the amount of charge of the capacitor 22 decreases, so that the output voltage Vout drops.

On the other hand, if the output voltage Vout drops from the target level while the average value of the input voltage Vrec is constant, the feedback voltage Vfb drops as well. Then, as the command voltage VA rises with drop in the feedback voltage Vfb, the average value of the reference current Iref rises as well. As a result, the average value of the inductor current IL increases as well and the amount of charge of the capacitor 22 increases, so that the output voltage Vout rises.

In this manner, the power factor correction IC 25 performs feedback control such that the output voltage Vout achieves the target level.

Power Factor Correction

As described above, the power factor correction IC 25 using the DSP 42a forms a current loop and a voltage loop as feedback loops. In other words, the power factor correction IC 25 is a current-mode control circuit.

Here, in the current-mode control circuit, the inductor current IL is controlled to achieve a value close to the reference current Iref irrespective of the value of the DC component of the inductor current IL. That is, it is possible to utilize such an idea that "it is acceptable to assume Ei≈Vsw(ave) as an approximate value", as mentioned in relation to the boost chopper circuit 201 in FIG. 4.

Further, as described above, the input voltage Vrec can be estimated by figuring out the duty ratio Doff, i.e., the command voltage Vx, instead of the average voltage Vsw (ave) under the condition that the output voltage Vout is constant in the boost chopper circuit 201. Similarly, the input voltage Vrec and the command voltages VC and VD have similar waveforms also in the power factor correction IC 25 that uses the DSP 42a, in which the output voltage Vout is controlled to be constant.

In an embodiment of the present disclosure, the command voltage VC, which results in having a waveform similar to the waveform of the input voltage Vrec, is inputted in to the multiplier 62. Further, in the multiplier 62, the product of the command voltage VA and the command voltage VC is used as the reference current Iref. Consequently, the reference current Iref results in also having the waveform of rectified sine waves which is similar to the waveform of the input voltage Vrec, thereby improving the power factor of the power supply.

Meanwhile, the description has been given here assuming that the output voltage Vout is constant. However, in actuality, the instantaneous value of the output voltage Vout may not be deemed to be constant under the influence of a ripple voltage which is caused when smoothing the voltage from the diode 24 using the capacitor 22. Specifically, the output voltage Vout in an embodiment of the present disclosure contains a ripple component (ripple voltage) originating from the AC voltage Vac, which is a commercial power supply. Thus, the command voltage VC, produced based on the feedback voltage Vfb, which has been obtained by dividing the output voltage Vout, also contains the ripple component of the AC voltage Vac.

Further, the operation when the command voltage VC is divided by the feedback voltage Vfb will be specifically described. For example, the ripple component of the AC voltage Vac may cause the output voltage Vout and the feedback voltage Vfb to be 10% greater than the average value. In such a timing that the feedback voltage Vfb is 1.1 times the average value, when the divider 67 divides the command voltage VC by "1.1", the command voltage VD results in VD=VC×(1/1.1). Accordingly, the OFF-time duty ratio "Doff" also results in "1/1.1" times a previous value.

At this time, however, the amplitude of the voltage Vsw is 1.1 times greater, similarly to the output voltage Vout, and thus the average voltage Vsw (ave) is the same as when the output voltage Vout is at the desired level. Thus, the proportional relationship between the command voltage VC and the input voltage Vrec is maintained.

Figure 8:
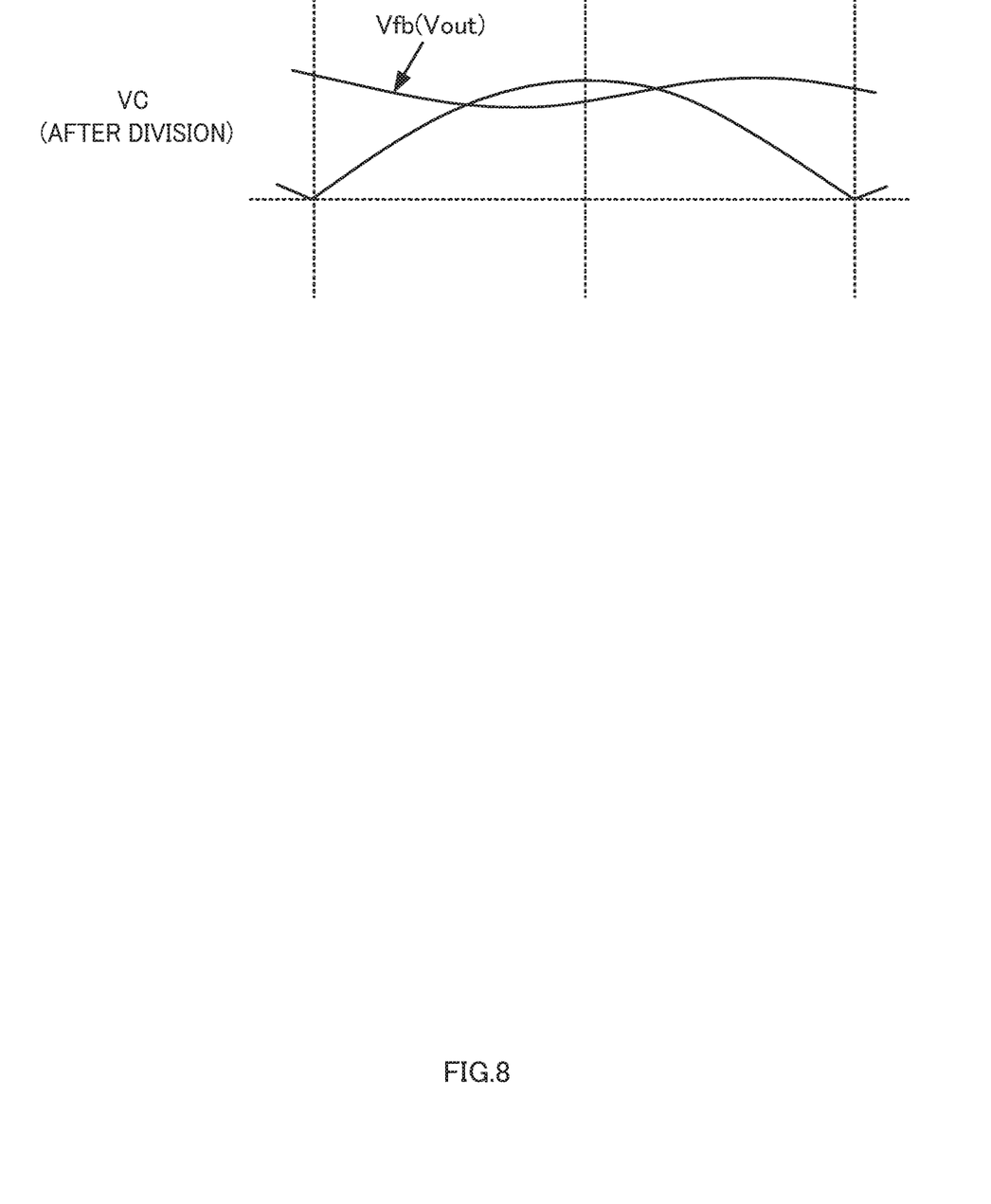
FIG. 8 is a diagram illustrating an example of waveforms in a divider 67.

As described above, since the divider 67 divides the command voltage VC, for example, by the feedback voltage Vfb, the ripple component in the command voltage VC is suppressed. Note that FIG. 8 is a diagram for explaining the waveform of the command voltage VC output from the divider 67. As illustrated in FIG. 8, a command voltage VC with the ripple component of the output voltage Vout removed is output from the divider 67.

Further, since the waveform of the command voltage VC is similar to the waveform of the input voltage Vrec, the waveform of the reference current Iref is also similar to the waveform of the input voltage Vrec. Thus, in an embodiment of the present disclosure, the power factor of the power supply is improved even if the output voltage Vout is affected by the ripple component.

Another Embodiment of DSP

Configuration of DSP 42b

Figure 9:
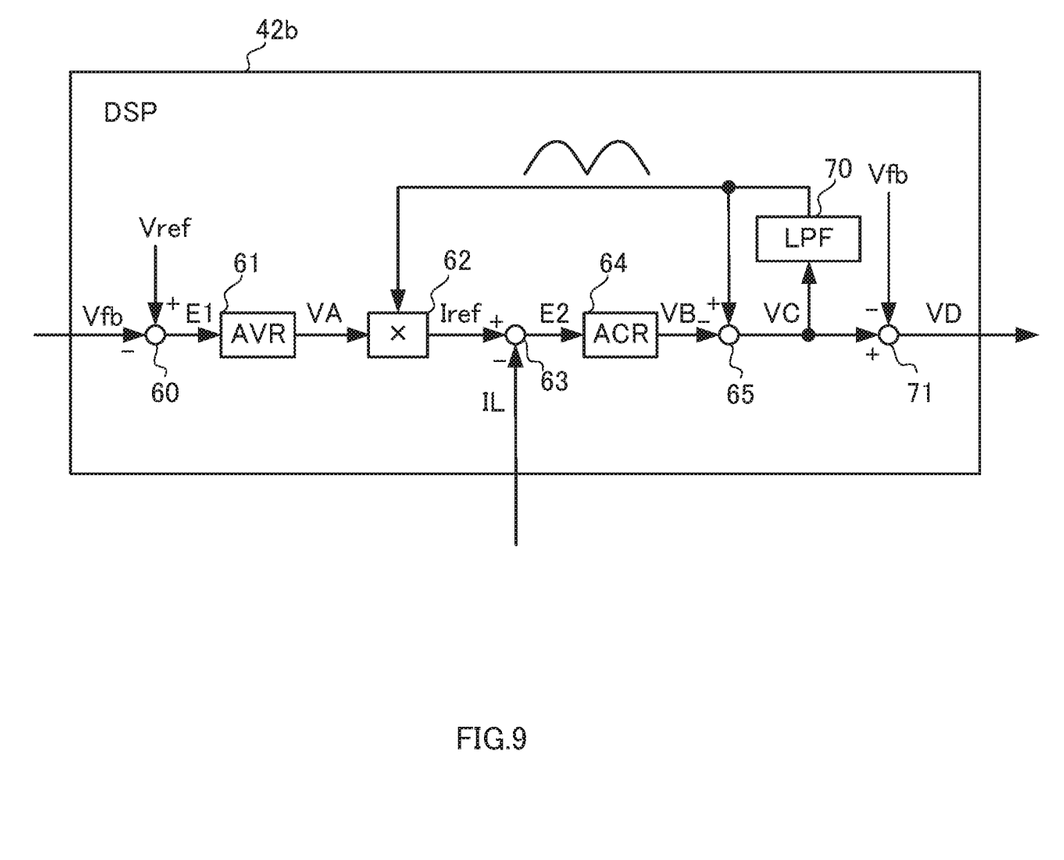
FIG. 9 is a diagram illustrating a configuration of a DSP 42b.

FIG. 9 is an example of functional blocks implemented in a DSP 42b which is another embodiment of the DSP 42. Similarly to the DSP 42a, the DSP 42b produces a command voltage VD, which serves as a reference for a drive signal Vd, based on the feedback voltage Vfb and the inductor current IL.

The DSP 42b includes subtractors 60, 63, 65, and 71, a voltage regulator 61, a multiplier 62, a current regulator 64, and a low pass filter (LPF) 70. Note that the blocks in FIG. 9 and the blocks in FIG. 7 denoted by the same reference numerals are the same. In the DSP 42b, the low pass filter 70 and the subtractor 71 are provided in place of the delay device 66 and the divider 67 used in the DSP 42a in FIG. 7, respectively. Thus, the low pass filter 70 and the subtractor 71 will be described here.

The low pass filter 70 is a filter that suppresses a voltage corresponding to the ripple component of the inductor current IL contained in the command voltage VC. Note that the ripple component of the inductor current IL refers to a component of the inductor current IL that varies at the switching frequency by switching the NMOS transistor 26. Here, since the command voltage VC varies with the inductor current IL, the command voltage VC contains the ripple component of the inductor current IL. In an embodiment of the present disclosure, the cutoff frequency of the low pass filter 70 (e.g., 10 kHz) is set lower than the switching frequency (e.g., 100 kHz), so as to suppress the voltage corresponding to the ripple component of the inductor current IL.

Further, the low pass filter 70 calculates and outputs, for example, the moving average of the values (sample values) of n successive command voltages VC. As a result, from the low pass filter 70, a command voltage VC with the ripple component suppressed is output with a delay. Hence, the low pass filter 70 outputs a previously output command voltage VC to the subtractor 65, similarly to the delay device 66. Accordingly, the subtractor 65 subtracts the command voltage VB, which is needed for the inductor current IL to achieve the reference current Iref, from a previously output command voltage VC (or adds the command voltage VB thereto if it is a negative voltage) and outputs the difference as a new command voltage VC. Such a configuration eliminates the need for the current regulator 64 to greatly vary the command voltage VB, thereby improving control characteristics of the current feedback loop.

In order to remove the ripple component of the AC voltage Vac from the command voltage VC, the subtractor 71 (second subtractor unit) subtracts a voltage corresponding to the feedback voltage Vfb, which varies similarly to the ripple component of the AC voltage Vac (e.g., the feedback voltage Vfb×α, where α is a predetermined coefficient), from the command voltage VC. In the case of using such a subtractor 71 as well, it is possible to suppress the effect of the ripple component on the command voltage VC, similarly to the divider 67.

As described above, even when using the above-described low pass filter 70 and subtractor 71 in place of the delay device 66 and the divider 67, the DSP 42b operates similarly to the DSP 42a. Thus, even when using the DSP 42b as well, the command voltage VC can achieve a waveform similar to the waveform of the input voltage Vrec, thereby improving the power factor of the power supply.

Summary

The AC-DC converter 10 according to an embodiment of the present disclosure has been described above. The power factor correction IC 25 of the AC-DC converter 10 is capable of causing the inductor current IL to achieve a waveform similar to the waveform of the input voltage Vrec without detecting the input voltage Vrec using a resistor or the like. Thus, the power factor correction IC 25 is capable of reducing power consumption of the AC-DC converter 10.

Further, although the command voltage VC is inputted into the multiplier 62 with a delay and/or the like, the present disclosure is not limited to the above. For example, the command voltage VC output from the subtractor 65 may be directly inputted into the multiplier 62 and multiplied by the command voltage VA. Even in such a case, the reference current Iref has a waveform similar to the waveform of the input voltage Vrec. Accordingly, the power factor of the AC-DC converter 10 is improved as in the power factor correction IC 25 according to an embodiment of the present disclosure.

Further, the multiplier 62 may multiply the command voltage VC delayed by the delay device 66 by the command voltage VA.

It is also possible to cause the inductor current IL to achieve the reference current Iref solely based on the command voltage VB from the current regulator 64, without using the subtractor 65, for example. In such a case, however, it usually takes a longer time for the inductor current IL to achieve the reference current Iref. In the DSP 42a, the subtractor 65 subtracts the command voltage VB from the command voltage VC output from the delay device 66 (or adds the command voltage VB thereto if it is a negative voltage) and outputs the difference as a command voltage VC. Accordingly, in the DSP 42a, a previously output command voltage VC as a reference, to calculate a new command voltage VC for the inductor current IL to achieve the reference current Iref. Thus, in the DSP 42a, the current regulator 64 does not need to greatly vary the command voltage VB, thereby improving control characteristics of the current feedback loop, and shortening the time period for the inductor current IL to achieve the reference current Iref.

Further, in the DSP 42b, the low pass filter 70 is used in place of the delay device 66. This can suppress the ripple component of the inductor current contained in the command voltage VC, thereby being able to cause the command voltage VC to have a waveform more similar to the waveform of the input voltage Vrec.

Further, the subtractor 65 of the DSP 42b subtracts the command voltage VB from the command voltage VC that is output from the low pass filter 70 (or adds the command voltage VB thereto if it is a negative voltage) and outputs the difference as a command voltage VC. In this manner, in the DSP 42b, a previously output command voltage VC as a reference, to calculate a new command voltage VC for the inductor current IL to achieve the reference current Iref. Accordingly, the current regulator 64 does not need to greatly vary the command voltage VB, thereby improving control characteristics of the current feedback loop.

Further, in the power factor correction IC 25, the drive signal output circuit 43 outputs the drive signal Vg to the terminal OUT based on the command voltage VD. Note that in an embodiment of the present disclosure, as the input voltage Vrec rises, the command voltage VD rises accordingly, so that the duty ratio Doff of the NMOS transistor 26 increases.

Further, in an embodiment of the present disclosure, the command voltage VD is output with the ripple component of the output voltage Vout contained in the command voltage Vc having been suppressed. Hence, the NMOS transistor 26 is driven by the command voltage VD, which has a waveform more similar to the waveform of the input voltage Vrec than the waveform of the command voltage VC. As a result, the power factor of the power supply is further improved.

Further, the divider 67 divides the command voltage VC by a value corresponding to the output voltage Vout (e.g., the voltage value of the feedback voltage Vfb) to suppress the effect of the ripple component of the output voltage Vout. Such a configuration sufficiently suppresses the effect of the ripple component of the output voltage Vout on the command voltage VD.

Further, the subtractor 71 subtracts a value corresponding to the output voltage Vout (e.g., the voltage value of the feedback voltage Vfb) from the command voltage VC to suppress the effect of the ripple component of the output voltage Vout. Such a configuration sufficiently suppresses the effect of the ripple component of the output voltage Vout on the command voltage VD.

It should be noted that the terms " . . . er/or or . . . device", " . . . circuit", and " . . . unit" are used for blocks having predetermined functions implemented by an integrated circuit. For example, "multiplier", "multiplier circuit", or "multiplier unit" is used for a block having a function of multiplying one signal by another signal.

Other Embodiments

For example, instead of the output from the delay device 66 or the low pass filter 70, the command voltage VC may be inputted directly into the multiplier 62. Such a configuration also achieves advantageous effects similar to the effects in an embodiment of the present disclosure.

Further, the power factor correction IC 25 uses the DSP 42 to process the feedback voltage Vfb and the like that have been converted into digital values by the AD converter 40 or the like, however, the present disclosure is not limited to the above. For example, functions similar to those of the blocks in the DSP 42 may be implemented in an analog circuit that uses an error amplifier circuit, an adder circuit, a subtractor circuit, and the like using operational amplifiers. Note that in such a case, the command voltages VA to VD and the like are analog values.

Further, in an embodiment of the present disclosure, the DSP 42 executes a program to implement the subtractor 60 or the like, however, the present disclosure is not limited to the above. For example, all the blocks in the DSP 42 (e.g., the subtractor 60 and the voltage regulator 61) may be implemented with a hardware circuit that uses no software (program). Note that the "hardware circuit" here refers to a circuit including a circuit element such as a resistor, a capacitor, a transistor, or the like, a digital circuit such as a logic circuit, and an analog circuit such as an operational amplifier.

Further, although the DSP 42*b* uses the low pass filter 70, the present disclosure is not limited to the low pass filter 70 as long as the filter suppresses the voltage corresponding to the ripple component of the inductor current IL. For example, the filter may be a band pass filter.

Further, a voltage based on the command voltage VC is inputted into the multiplier 62, however, for example, the command voltage VD may be inputted into the multiplier 62 and the command voltage VA may be multiplied by the command voltage VD. In such a case, the output of the delay device 66 or the low pass filter 70 is inputted only into the subtractor 65. Since the command voltage VD has a waveform similar to the waveform of the input voltage Vrec, the multiplier 62 is used to multiply the command voltage VA by the command voltage VD (command value), so that the reference current Iref can achieve a waveform similar to the waveform of the input voltage Vrec. Thus, in such a case as well, the power factor of the power supply can be improved as in an embodiment of the present disclosure. Note that in this case, the subtractor 63, the current regulator 64, the subtractor 65, and the divider 67 (or the subtractor 71) correspond to the command value output unit.

Further, the output from the comparator 57 and the drive signal Vg also vary similarly to the command voltages VC and VD. Thus, for example, a signal obtained by smoothing the output from the comparator 57 or the drive signal Vg using a low pass filter (not illustrated) may be inputted into the multiplier 62 and the command voltage VA may be multiplied thereby.

Further, the power factor correction IC 25 includes the gate driver 58, however, the present disclosure is not limited to the above. For example, a gate driver (not illustrated) may be provided outside the power factor correction IC 25 depending on the capacitance of the NMOS transistor 26. In such a case, the power factor correction IC 25 excluding the gate driver 58 corresponds to a drive signal generating circuit.

Further, in the DSP 42*a*, the delay device 66 and the divider 67 are provided, however, the present disclosure is not limited to the above combination. In the power factor correction IC 25, one of the delay device 66 and the low pass filter 70 (or the above-mentioned band pass filter) and one of the divider 67 and the subtractor 71 may be combined in a freely selected manner.

The above embodiments of the present disclosure are simply for facilitating the understanding of the present disclosure and are not in any way to be construed as limiting the present disclosure. The present disclosure may variously be changed or altered without departing from its spirit and encompass equivalents thereof.

What is claimed is:

1. A drive signal generating circuit configured to generate a drive signal for turning on and off a transistor that is connected to an inductor and controls an inductor current flowing through the inductor, from a feedback voltage obtained from an output voltage of a power supply circuit to control the output voltage to be a target level, the inductor being configured to receive a power supply voltage from a rectifier circuit that rectifies an AC voltage, the drive signal generating circuit comprising:
   a computing device; and
   a storage medium containing program instructions stored therein, execution of which by the computing device causes the drive signal generating circuit to provide the functions of:
   a reference current output unit configured to output a reference current for controlling the inductor current; and
   a command value output unit configured to output a first command voltage for increasing the inductor current when the inductor current is smaller than the reference current and decreasing the inductor current when the inductor current is greater than the reference current;
a voltage suppressing unit that suppresses a ripple component of the first command voltage; and
a drive signal output circuit configured to generate the drive signal using an output of the voltage suppressing unit such that the output voltage achieves the target level,
the reference current output unit being configured to output the reference current using the first command voltage and a value corresponding to a first error obtained from a difference between the feedback voltage and the target level.

2. The drive signal generating circuit according to claim 1, wherein
the reference current output unit is a multiplier unit that multiplies the value corresponding to the first error by the first command voltage output from the command value output unit, and outputs a multiplied result as the reference current.

3. The drive signal generating circuit according to claim 1, wherein
the functions of the drive signal generating circuit further include those of a delay unit configured to delay the first command voltage to output a delayed first command voltage, and
the reference current output unit is a multiplier unit that multiplies the value corresponding to the first error by the delayed first command voltage output from the delay unit, and outputs a multiplied result as the reference current.

4. The drive signal generating circuit according to claim 3, wherein
the command value output unit comprises
an output unit that outputs a value corresponding to a second error obtained by a difference between the inductor current and the reference current, and
a first subtractor unit that subtracts the value corresponding to the second error from the delayed first command voltage output from the delay unit, and outputs a difference as the first command voltage.

5. The drive signal generating circuit according to claim 1, wherein
the functions of the drive signal generating circuit further include those of a filter configured to suppress a ripple component of the inductor current to output a ripple suppressed current, and
the reference current output unit is a multiplier unit that multiplies the value corresponding to the first error by the ripple suppressed current output from the filter, and outputs a multiplied result as the reference current.

6. The drive signal generating circuit according to claim 5, wherein
the command value output unit includes
an output unit that outputs a value corresponding to a second error obtained from a difference between the inductor current and the reference current, and
a first subtractor unit that subtracts the value corresponding to the second error from the rippled suppressed current, and outputs a difference as the first command voltage.

7. The drive signal generating circuit according to claim 1, wherein
the voltage suppressing unit is a divider unit that divides the first command voltage by the feedback voltage.

8. The drive signal generating circuit according to claim 1, wherein
the voltage suppressing unit is a second subtractor unit that subtracts the feedback voltage from the first command voltage.

9. The drive signal generating circuit according to claim 1, wherein
the drive signal output circuit includes
a comparator configured to compare the output of the voltage suppressing unit with an oscillating voltage at a predetermined frequency, and
an output circuit configured to output the drive signal for turning off the transistor when the output of the voltage suppressing unit is higher than the oscillating voltage and turning on the transistor when the output of the voltage suppressing unit is lower than the oscillating voltage.

10. A power supply circuit, comprising:
the drive signal generating circuit according to claim 1;
the transistor that is turned on and off by the drive signal generated by the drive signal generating circuit, the power supply circuit producing the output voltage of the target level from the AC voltage;
the rectifier circuit that rectifies the AC voltage; and
the inductor to which the power supply voltage from the rectifier circuit is applied.

11. A drive signal generating circuit configured to generate a drive signal for turning on and off a transistor that is connected to an inductor and controls an inductor current flowing through the inductor, from a feedback voltage obtained from an output voltage of a power supply circuit to control the output voltage to be a target level, the inductor being configured to receive a power supply voltage from a rectifier circuit that rectifies an AC voltage, the drive signal generating circuit comprising:
a reference current output circuit configured to output a reference current for controlling the inductor current;
a command value output circuit configured to output a first command voltage for increasing the inductor current when the inductor current is smaller than the reference current and decreasing the inductor current when the inductor current is greater than the reference current;
a voltage suppressing circuit that suppresses a ripple component of the first command voltage to output a second command voltage, and
a drive signal output circuit configured to generate the drive signal using an output of the voltage suppressing circuit such that the output voltage achieves the target level, wherein
the reference current output circuit is configured to output the reference current using the first command voltage and a value corresponding to a first error obtained from a difference between the feedback voltage and the target level.

12. A power supply circuit, comprising:
the drive signal generating circuit according to claim 11;
the transistor that is turned on and off by the drive signal generated by the drive signal generating circuit, the power supply circuit producing the output voltage of the target level from the AC voltage;
the rectifier circuit that rectifies the AC voltage; and
the inductor to which the power supply voltage from the rectifier circuit is applied.

* * * * *